United States Patent
Totzke et al.

(10) Patent No.: US 6,853,649 B1
(45) Date of Patent: Feb. 8, 2005

(54) METHOD FOR CONTROLLING PACKET-ORIENTED DATA FORWARDING VIA A COUPLING FIELD

(75) Inventors: Jürgen Totzke, Poing (DE); Reinhard Deml, München (DE); Mike Thoms, Germering (DE); Josef Wahler, Taufkirchen (DE); Gunnar Boll, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/296,121

(22) Filed: Apr. 21, 1999

(30) Foreign Application Priority Data

Apr. 21, 1998 (DE) ......................................... 198 17 789

(51) Int. Cl.[7] ........................... H04J 3/16; H04L 12/26; H04L 12/28
(52) U.S. Cl. ..................... 370/468; 370/229; 370/235; 370/395.2
(58) Field of Search ............................... 370/229–238, 370/468, 395.1, 395.2, 395.21, 395.4, 395.41, 395.42, 395.43, 411–419; 709/215, 225, 226, 227, 228–229

(56) References Cited

U.S. PATENT DOCUMENTS

| | | | | |
|---|---|---|---|---|
| 5,742,601 A | * | 4/1998 | Riedel ...................... | 370/395.4 |
| 5,838,663 A | * | 11/1998 | Elwalid et al. ............. | 370/233 |
| 5,940,372 A | * | 8/1999 | Bertin et al. ................ | 370/238 |
| 5,982,748 A | * | 11/1999 | Yin et al. ................... | 370/232 |
| 5,982,750 A | * | 11/1999 | Tabe et al. .................. | 370/252 |
| 6,028,840 A | * | 2/2000 | Worster ...................... | 370/230 |
| 6,046,981 A | * | 4/2000 | Ramamurthy et al. ...... | 370/232 |
| 6,160,818 A | * | 12/2000 | Berger et al. ............... | 370/468 |
| 6,212,163 B1 | * | 4/2001 | Aida ........................ | 370/395.43 |
| 2002/0036981 A1 | * | 3/2002 | Park ........................ | 370/395.2 |

FOREIGN PATENT DOCUMENTS

| | | |
|---|---|---|
| DE | 4328862 A1 | 3/1985 |
| DE | 4134476 C1 | 5/1993 |
| DE | 19521069 C1 | 6/1996 |
| EP | 0678996 A2 | 10/1995 |
| EP | 0753979 A1 | 1/1997 |

OTHER PUBLICATIONS

"MOS Integrated Circuit µPD98410", NEC Corporation, 1997, Document No. S12624EJ1V0DS00 (1st edition).
"Traffic Management for an ATM Seitch with Per–VC Queuing: Concept and Implementation", Uwe Briem et al., IEEE Communications Magazine, Jan. 1998, pp. 88–93.

* cited by examiner

*Primary Examiner*—Steven Nguyen
(74) *Attorney, Agent, or Firm*—Laurence A. Greenberg; Werner H. Stemer; Gregory L. Mayback

(57) ABSTRACT

In the context of making a cell-loss-sensitive connection between an originating subscriber device and a destination subscriber device via an ATM coupling field, a connection is set up only if the sum of the connection bandwidths of cell-loss-sensitive connections, executed via a logical point-to-point connection connecting the destination subscriber device with the ATM coupling field and in the process of being made, is less than or equal to a predeterminable limit value. All other connections are set up without checking.

10 Claims, 1 Drawing Sheet

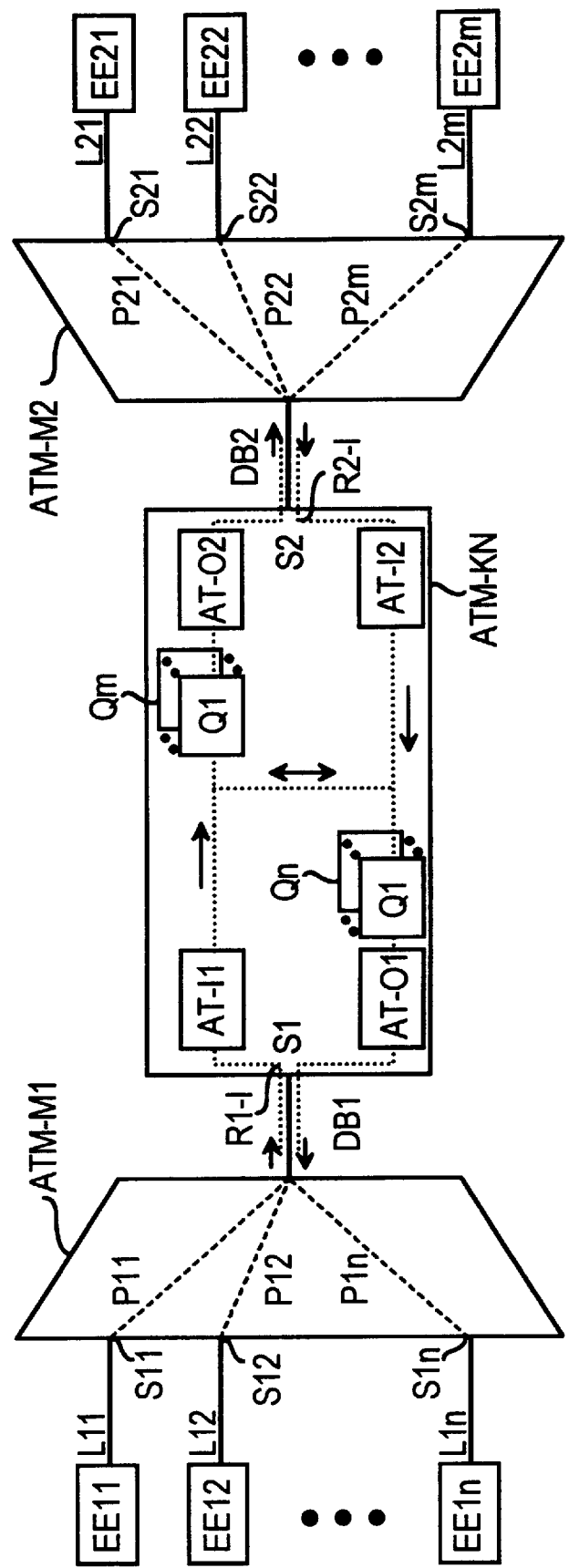

METHOD FOR CONTROLLING PACKET-ORIENTED DATA FORWARDING VIA A COUPLING FIELD

BACKGROUND OF THE INVENTION

Field of the Invention

Because in modern communications technology there is an increasing demand for the transmission of video information, such as still and moving images in video telephone applications, or the representation of high-resolution graphics in modern data processing systems, the significance of transmission and switching techniques for high data transmission rates (over 100 megabits per second) is increasing. One known data transmission method for high data speeds is known as the asynchronous transfer mode (ATM). At present, data transmission on the basis of the asynchronous transfer mode makes a variable transmission bit rate of up to 622 megabits per second (Mbit/s) possible.

From the data sheet entitled "MOS INTEGRATED CIRCUIT μPD98410" published by NEC Corporation, 1997, Document No. S12624EJ1V0DS00 (1st edition), a large-scale-integrated ATM switching chip with a processing speed of 1.2 gigabits per second (Gbit/s) is known, which allows the addressing of a plurality of subscriber-oriented interfaces via a high-frequency ATM-specific bus interface (UTOPIA: Universal Test & Operations PHY Interface for ATM).

It has already been proposed that so-called ATM multiplexers be used for connecting subscriber devices to the ATM-specific bus interface of the high-frequency ATM switching chip. In them, a plurality of low-rate connection lines (with a bit transmission rate of 25.6 Mbit/s or 155 Mbit/s, for instance) intended for connecting the subscriber devices are concentrated by an ATM multiplexer on the higher-rate connection line of the high-frequency ATM switching chip (which has a bit transmission rate of 622 Mbit/s, for instance).

In a subscriber device, such as a data processing system, multiple different applications each running simultaneously are typically handled, such as a video telephone application and data forwarding on the basis of the IP (Internet Protocol) for an internet application. These different applications, because of their different needs for individual-application data forwarding, result in different connections between any two subscriber devices. The needs are addressed by an assurance, or so-called service fidelity quality. Here a distinction is made between cell-loss-sensitive and non-cell-loss-sensitive applications. The cell-loss-sensitive applications, data forwarding is effected via real-time-oriented connections, in which the loss of a data cell leads to a sacrifice in the quality of the connection, since because of real-time requirements, for instance, the lost data cell cannot be re-forwarded. In non-cell-loss-sensitive applications, data forwarding is effected via non-real-time-oriented connections, in which the loss of a forwarded data cell can be compensated for by re-forwarding of the lost data cell or of a cohesive succession of data cells (for instance in IP-based data forwarding).

To meet these needs, that is, to assure the "service fidelity quality", in the context of making a connection, so-called service fidelity parameters are forwarded from the subscriber devices to the controller of an ATM switching system by a standardized signaling method (standardized in: ATM Forum, User Network Interface Specification, Version 4.0). As a result, a constant data transmission rate, often abbreviated as "CBR" (for constant bit rate) in the literature, is furnished for a connection, or real-time-critical data forwarding, often abbreviated as "rt VBR" (for real-time variable bit rate), is assured via a coupling field of the ATM switching system (in accordance with ATM Forum, Traffic Management Specification, Version 4.0).

From the article, "Traffic Management for an ATM Switch with Per-VC Queueing: Concept and Implementation", IEEE Communications Magazine, January 1998, it is known that large ATM switching systems, to assure the "service fidelity parameter" of a connection, have additional multiplexing units (SMUs, for Statistical Multiplexing Units), which on the basis of the "service fidelity parameters" forwarded control the data forwarding via the coupling field by a special method, in the literature, often called "statistical multiplexing". Statistics multiplexing dictates buffer storage of the data to be forwarded and thus requires that large memory units be furnished.

To assure the "service fidelity-quality" of connections existing between terminal devices if the agreed-upon "service fidelity parameters" are infringed by some other terminal device, so-called real-time traffic monitoring mechanisms, in the literature, often also called "policing", are additionally implemented in large ATM switching systems.

In smaller ATM switching systems, furnishing large memory units and implementing complicated real-time traffic monitoring mechanisms, also known as "workgroup switches", is not commercially feasible, however.

SUMMARY OF THE INVENTION

It is accordingly an object of the invention to provide a method for controlling packet-oriented data forwarding via a coupling field that overcomes the above-mentioned disadvantages of the prior art methods of this general type, in which a connection between two subscriber devices has been set up for a cell-loss-sensitive application and is based on packet-oriented data forwarding, cell-loss-free data forwarding between the subscriber devices is assured via the coupling field.

With the foregoing and other objects in view there is provided, in accordance with the invention, a method for controlling packet-oriented data forwarding via a coupling field, which includes: connecting each of a plurality of subscriber devices, via a respective logical point-to-point connection, to a common interface of a coupling field; setting an individual-connection total bandwidth and an individual-connection partial line bandwidth for real-time-oriented data forwarding to each of the respective logical point-to-point connections; ascertaining in a context of making a connection for the real-time-oriented data forwarding between an originating subscriber device and a destination subscriber device, a sum of connection bandwidths of connections currently executed via the respective logical point-to-point connection of the destination subscriber device and connections in a process being made for the real-time-oriented data forwarding; and setting up the connection only if the sum of the connection bandwidths is less than or equal to a predeterminable limit value.

A substantial advantage of the invention is that the method of the invention can easily be integrated with an existing ATM switching system.

Another advantage of the invention is that the total processing speed of the subscriber devices connected to the coupling field is higher than the bandwidth furnished by the interface of the coupling field for data forwarding from the connected subscriber devices to the coupling field can be. This is due to the fact that a cell-loss-free data forwarding is guaranteed only for connections set up in the context of a non-cell-loss-sensitive application. A data loss in the context of a non-cell-loss-sensitive application can be compensated for, for instance by re-forwarding the lost cell or a cohesive succession of data cells (for example, in a data forwarding based on the IP). Thus subscriber devices with a higher processing speed can be connected to an ATM switching system in which the method of the invention is implemented.

An implementation of input scanners and output scanners assures that in cases where in the context of making a connection, the "service fidelity parameters" agreed upon by a subscriber device for the connection with the coupling field are infringed, only connections of the subscriber device are impaired by the infringement. Other connections made via the coupling field between subscriber devices not involved in the connection are unaffected by the infringement of the "service fidelity parameters".

For each subscriber device addressable by the coupling field, the coupling field also has a fixed number of individual-subscriber-device FIFO memories, each of which is assigned different priorities (which are identical for each destination subscriber device) for data forwarding to a destination subscriber device, as a function of the agreed-upon service fidelity parameters, in the literature also often called "traffic class". An individual-subscriber-device FIFO memory, which is intended for buffer storage of data to be forwarded in a cell-loss-sensitive application, is assigned a higher priority than an individual-subscriber-device FIFO memory, which is intended for buffer storage of data to be forwarded in a non-cell-loss-sensitive application. By the buffer storage of data, to be forwarded to a destination subscriber device, in an individual-subscriber-device FIFO memory as a function of the agreed-upon "service fidelity parameters", it is assured that if the agreed-upon "service fidelity parameters" are infringed, a data loss can occur only in connections set up in the context of non-cell-loss-sensitive applications.

Other features which are considered as characteristic for the invention are set forth in the appended claims.

Although the invention is illustrated and described herein as embodied in a method for controlling packet-oriented data forwarding via a coupling field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, structural block diagram of an ATM coupling field with subscriber devices connected in it.

DESCRIPTION OF THE PREFERRED EMBODIMENTS

Referring now to the single FIGURE of the drawing in detail, there is shown schematically an ATM coupling field ATM-KN (with a processing speed of 1.2 Gbit/s, for instance). The ATM coupling field ATM-KN has a first and a second interface S1, S2, via which the ATM coupling field ATM-KN is connected to a first and second multiplexer ATM-M1, ATM-M2 via a first and second bidirectional data bus DB1, DB2 (with a physical bandwidth of 622 Mbit/s, for instance). For connecting subscriber devices to the ATM coupling field ATM-KN, subscriber devices EE11, . . . , EE1$n$ are each connected via a respective connection line L11, . . . , L1$n$ to a respective ATM interface S11, . . . , S1$n$ of the first ATM multiplexer ATM-M1, and subscriber devices EE21, . . . , EE2$n$ are each connected via a respective connection line L21, . . . , L2$m$ to a respective ATM interface S11, . . . , S1$m$ of the second ATM multiplexer ATM-M2.

The subscriber devices EE11, . . . , EE1$n$; EE21, . . . , EE2$m$ are thus connected to the ATM coupling field ATM-KIN via logical point-to-point connections P11, . . . , P1$n$; P21, . . . , P2$m$ (shown in dashed lines in the drawing). For each of the logical point-to-point connections P11, . . . , P1$n$; P21, . . . , P2$m$, different total bandwidths LBB can be set for data forwarding.

In the data transmission method known as the asynchronous transfer mode (ATM), data packets of fixed length, known as cells, are used for the data transport. An ATM cell is composed of a 5-byte cell header, which includes the switching data relevant to transporting the ATM cell, and a 48-byte useful data field, or so-called "payload".

In the forwarding of ATM cells from a subscriber device EE11, . . . , EE1$n$; EE21, . . . , EE2$m$ to the ATM coupling field ATM-KN, the ATM cells, forwarded via the logical point-to-point connection P11, . . . , P1$n$; P21, . . . , P2$m$, in the first and second ATM multiplexer ATM-M1, ATM-M2 are buffer-stored in individual FIFO memories (First In First Out). The buffer-stored ATM cells are read out of the FIFO memories and forwarded to the ATM coupling field ATM-KN in accordance with the transmission bandwidth agreed upon for the connection. Forwarding ATM cells from the ATM coupling field ATM-KN to a subscriber device EE11, . . . , EE1$n$; EE21, . . . , EE2$m$ is done analogously.

The ATM coupling field ATM-KN also has two input scanners ATI1, AT-I2 and two output scanner AT-O1, AT-O2. The input scanner AT-I1 and the output scanner AT-O1 are assigned to the first interface S1, and the input scanner AT-I2 and the output scanner AT-O2 are assigned to the second interface S2. For data forwarding originating in the ATM coupling field ATM-KN via the first interface S1, the ATM coupling field ATM-KN has n individual-subscriber-device FIFO memories (First In First Out) Q1, . . . , Qn, and for data forwarding originating in the ATM coupling field ATM-KN via the second interface S2, the ATM coupling field ATM-KN has m individual-subscriber-device FIFO memories Q1, . . . , Qm. The individual-subscriber-device FIFO memories Q1, . . . , Qm; Q1, . . . , Qm are subdivided into a fixed number of partial memories, and each partial memory of an individual-subscriber-device FIFO memory Q1, . . . , Qm; Q1, Qm, often called "weighted fair queues" in the literature, is assigned a different priority.

Thus a partial memory that is intended for buffer storage of data to be forwarded in the context of a cell-loss-sensitive application is assigned a higher priority than a partial memory that is intended for buffer storage of data to be forwarded in the context of a non-cell-loss-sensitive application. This assures that in cases in which the agreed-upon "service fidelity parameters", such as an assurance of a constant transmission bandwidth of 2 Mbit/s, cannot be adhered to by a subscriber device EE11, . . . , EE1$n$; EE21, . . . , EE2$m$, a data loss occurs first at lower-priority connections set up in the context of a non-cell-loss-sensitive application.

Because of the total bandwidth LBB agreed upon for the logical point-to-point connection P11, . . . , P1n; P21, . . . , P2m between a subscriber device EE11, . . . , EE1n; EE21, . . . , EE2m and the ATM coupling field ATM-KN, for every logical point-to-point connection P11, . . . , P1n; P21, . . . , P2m for data forwarding both sent to and originating in the ATM coupling field ATM-KN, a so-called cell rate interval for the applicable logical point-to-point connection P11, . . . , P1n; P21, . . . , P2m, i.e., the number of ATM cells that are to be sent within a certain time interval from the subscriber device EE11, . . . , EE1n; EE21, . . . , EE2m to the ATM coupling field ATM-KN or from the ATM coupling field ATM-KN to the subscriber device EE11, . . . , EE1n; EE21, . . . , EE2m, is ascertained. On the input side the logical point-to-point connections P11, . . . , P1n; P21, . . . , P2m are switched through in succession by the input scanners AT-I1, AT-I2 in accordance with the cell rate interval to the individual-subscriber-device FIFO memories Q1, . . . , Qm; Q1, . . . , Qm. The ATM cells forwarded in the context of a terminal device connection from an originating subscriber device EE11, EE1n; EE21, . . . , EE2m to the ATM coupling field ATM-KN are buffer-stored, because of the service fidelity parameters agreed upon for this terminal device connection, in a corresponding partial memory of the individual-subscriber-device FIFO memories Q1, . . . , Qm; Q1, . . . , Qm assigned to the destination subscriber device EE11, . . . , EE1n; EE21, . . . , EE2m. On the output side, the ATM cells to be forwarded are read out of the individual-subscriber-device FIFO memories Q1, Qm; Q1, . . . , Qm at the agreed-upon cell rate interval and are forwarded to the addressed destination subscriber device EE11, . . . , EE1n; EE21, . . . , EE2m.

By the input scanners AT-I1, AT-I2 and the output scanner AT-O1, AT-O2, it is assured that in cases in which the service fidelity parameters agreed upon by a subscriber device EE11, EE1n; EE21, . . . , EE2m, in the context of making a connection, for this connection with the ATM coupling field ATM-KN are infringed by a subscriber device EE11, . . . , EE1n; EE21, . . . , EE2m, only connections of this subscriber device EE11, . . . , EE1n; EE21, . . . , EE2m, can be impaired by this infringement. Other connections made via the ATM coupling field ATM-KN between subscriber devices EE11, . . . , EE1n; EE21, EE2m not involved in the connection are unaffected by the infringement of the service fidelity parameters.

In order to enable assuring a loss-free data forwarding via the ATM coupling field ATM-KN for connections set up in the context of cell-loss-sensitive applications, one individual partial line bandwidth TBB is set for all the logical point-to-point connections P11, . . . , P1n; P21, . . . , P2m between the ATM coupling field ATM-KN and the subscriber device EE11, EE1n; EE21, . . . , EE2m. The set partial line bandwidth TBB of the logical point-to-point connection P11, . . . , P1n; P21, . . . , P2m designates the maximum available connection bandwidth that can be made available, via a connection line L11, . . . , L1n; L21, . . . , L2nm for data forwarding in the context of one or more cell-loss-sensitive applications. The definition of the partial line bandwidth TBB is done such that the sum of the partial line bandwidths TBB of the logical point-to-point connections P11, . . . , P1n; P21, . . . , P2m carried via an ATM multiplexer ATM-M1, ATM-M2 does not exceed the bandwidth, equivalent to the furnished bandwidth $BB_{R1-I}$ at the respective reference point R1-I and R2-I, furnished by the corresponding subscriber interface S1, S2 for a data transfer from the subscriber devices EE11, . . . , EE1n; EE21, . . . , EE2m to the ATM coupling field ATM-KN:

$$\sum_{P11...P1n} TBB \leq BB_{R1-1} \text{ and } \sum_{P21...P2m} TBB \leq BB_{R2-1}.$$

Furthermore, the number n, m of the logical point-to-point connections P11, . . . , P1n; P21, . . . , P2m carried via one ATM multiplexer ATM-M1, ATM-M2 (which corresponds to the number of subscriber devices EE11, . . . , EE1n; EE21, . . . , EE2m connected to one ATM multiplexer ATM-M1, ATM-M2) is limited by the furnished bandwidth $BB_{R1-I}$, $BB_{R2-I}$ at the respective reference point R1-I and R2-I:

$$\sum_{P11...P1n} LBB \leq BB_{R1-1} + \lambda_1 \text{ and } \sum_{P21...P2m} LBB \leq BB_{R2-1} + \lambda_2.$$

The ascertained sum of bandwidths LBB of the logical point-to-point connections P11, . . . , P1n; P21, . . . , P2m carried via one ATM multiplexer ATM-M1, ATM-M 2 can exceed the furnished bandwidth $BB_{R1-I}$, $BBR_{R2-I}$ at the respective reference point R1-I and R2-I by a value of $\lambda_1$ and $\lambda_2$, respectively. The values $\lambda_1$ and $\lambda_2$ are determined by the number of memory spaces present in the ATM multiplexers ATM-M1, ATM-M2.

In the context of making a connection for cell-loss-sensitive applications between an originating subscriber device EE11 and a destination subscriber device EE21, a check is performed as to whether the sum of connection bandwidths $BB_{ZSV}$ of connections currently executed via the logical point-to-point connection P21 and the ATM coupling field ATM-KN and the destination subscriber device EE21 and connections in the process of being made in the context of cell-loss-sensitive applications exceeds the partial line bandwidth $TBB_{P21}$ defined for the logical point-to-point connection P21:

$$\sum_{\text{connections}} BB_{ZSV} \leq TBB_{P21}.$$

If the ascertained sum of connection bandwidths $BB_{ZSV}$ is less than or equal to the partial line bandwidth $TBB_{P21}$ defined for the logical point-to-point connection P21 between the ATM coupling field ATM-KN and the destination subscriber device EE21, then the connection request is accepted, and the connection between the originating subscriber device EE11 and the destination subscriber device EE21 is set up.

By combining the output scanner AT-O2, which realizes data forwarding between the ATM coupling field ATM-KN and the destination subscriber device EE21 via the logical point-to-point connection P21 with the set total bandwidth LBB, with the individual-subscriber-device FIFO memory Q1 weighted by the assignment of a priority, a cell-loss-free data forwarding is guaranteed for connections set up in the context of cell-loss-sensitive applications. For connections set up in the context of non-cell-loss-sensitive applications, no cell-loss-free data forwarding is assured, since a data loss can be compensated for in that case, for instance by re-forwarding the lost data cells.

We claim:

1. A method for controlling packet-oriented data forwarding via a coupling field, which comprises:

connecting each of a plurality of subscriber devices, via a respective logical point-to-point connection, to a common interface of a coupling field;

setting an individual-connection total bandwidth and an individual-connection partial line bandwidth for real-time-oriented data forwarding to each of the respective logical point-to-point connections;

ascertaining in a context of making a connection for the real-time-oriented data forwarding between an originating subscriber device and a destination subscriber device, a sum of connection bandwidths of connections currently executed and connections in a process of being made for the real-time-oriented data forwarding via the respective logical point-to-point connection of the destination subscriber device; and setting up the connection only if the sum of the connection bandwidths is less than or equal to a predeterminable limit value.

2. The method according to claim 1, which comprises connecting each of further subscriber devices, via a further respective logical point-to-point connection, to a further interface common to the further subscriber devices of the coupling field.

3. The method according to claim 1, which comprises setting the predeterminable limit value equal to the individual-connection partial line bandwidth of the respective logical point-to-point connection connecting the destination subscriber device to the coupling field.

4. The method according to claim 1, which comprises effecting the setting of the individual-connection partial line bandwidth of the respective logical point-to-point connection such that a sum of individual-connection partial line bandwidths of the respective logical point-to-point connections does not exceed a predeterminable further limit value.

5. The method according to claim 4, which comprises setting the predeterminable further limit value equal to a bandwidth from the common interface of the coupling field for a data transfer from subscriber devices to the coupling field.

6. The method according to claim 1, which comprises limiting a number of the logical point-to-point connections by the fact that a sum of individual-connection total bandwidths of the logical point-to-point connections is allowed to be greater, by only a predeterminable value, than a bandwidth made available by the common interface of the coupling field for a data transfer from subscriber devices to the coupling field.

7. The method according to claim 1, which comprises:

providing the coupling field with at least one input scanner and at least one output scanner; and setting up, via the at least one input scanner and the at least one output scanner, the logical point-to-point connections such that data forwarding between the coupling field and the destination subscriber device is effected by the setting of the individual-connection total bandwidth.

8. The method according to claim 1, which comprises:

providing an individual-subscriber-device first-in-first-out (FIFO) memory in the coupling field for each addressable subscriber device that is subdivided into a fixed number of partial memories; and storing data to be forwarded from the originating subscriber device to the destination subscriber device in a partial memory of the individual-subscriber-device FIFO memory associated with the destination subscriber device.

9. The method according to claim 8, which comprises effecting a buffer storage in the partial memory in dependence on a terminal device connection class agreed upon between the originating subscriber device and the destination subscriber device.

10. The method according to claim 8, which comprises setting different priorities for the partial memories of the individual-subscriber-device FIFO memory in that a higher priority is set for the partial memories intended for storing data in the context of real-time-oriented data forwarding than for the partial memories intended for storing of data in the context of non-real-time-oriented data forwarding.

* * * * *